(12) United States Patent
Tokumitsu

(10) Patent No.: US 8,759,560 B2
(45) Date of Patent: Jun. 24, 2014

(54) SURFACE-MODIFIED ZIRCONIA NANOCRYSTAL PARTICLE AND METHOD FOR PRODUCING SAME

(75) Inventor: Shuzo Tokumitsu, Tokyo (JP)

(73) Assignee: Hoya Corporation, Tokyo (JP)

( * ) Notice: Subject to any disclaimer, the term of this patent is extended or adjusted under 35 U.S.C. 154(b) by 269 days.

(21) Appl. No.: 13/322,655

(22) PCT Filed: Jun. 14, 2010

(86) PCT No.: PCT/JP2010/060008
§ 371 (c)(1),
(2), (4) Date: Nov. 28, 2011

(87) PCT Pub. No.: WO2010/147069
PCT Pub. Date: Dec. 23, 2010

(65) Prior Publication Data
US 2012/0071680 A1    Mar. 22, 2012

(30) Foreign Application Priority Data

Jun. 16, 2009  (JP) .................................. 2009-143196
Sep. 29, 2009  (JP) .................................. 2009-224342

(51) Int. Cl.
*C07F 7/00* (2006.01)
*C07F 9/02* (2006.01)

(52) U.S. Cl.
USPC ................. 556/19; 556/24; 556/54; 977/773; 977/896

(58) Field of Classification Search
USPC .......................... 556/19, 24, 54; 977/773, 896
See application file for complete search history.

(56) References Cited

U.S. PATENT DOCUMENTS

| | | |
|---|---|---|
| 5,338,890 A | 8/1994 | Knifton et al. |
| 2009/0202815 A1 | 8/2009 | Campazzi et al. |
| 2009/0220840 A1 | 9/2009 | Yamaguchi et al. |

FOREIGN PATENT DOCUMENTS

| | | |
|---|---|---|
| JP | A-06-032604 | 2/1994 |
| JP | A-07-316084 | 12/1995 |
| JP | A-2007-217268 | 8/2007 |
| JP | A-2008-239436 | 10/2008 |
| JP | A-2008-273801 | 11/2008 |
| WO | WO 2007/029346 A1 | 3/2007 |
| WO | WO 2007/119023 A2 | 10/2007 |
| WO | WO 2008/075784 A1 | 6/2008 |

OTHER PUBLICATIONS

Chatry et al., "Synthesis of Non-aggregated Nanometric Crystalline Zirconia Particles," *Materials Research Bulletin*, vol. 29, No. 5, 1994, pp. 517-522, U.S.A.
Sep. 7, 2010 International Search Report issued in International Patent Application No. PCT/JP2010/060008.
Jul. 29, 2013 Office Action issued in Japanese Patent Application No. 2009-224342.
Mizuno et al., "High-yield sol-gel synthesis of well-dispersed, colorless $ZrO_2$ nanocrystals," *Langmuir*, 2006, pp. 7137-7140, vol. 22.
Joo et al., "Multigram scale synthesis and characterization of monodisperse tetragonal zirconia nanocrystals," *J. Am. Chem. Soc.*, May 1, 2003, pp. 6553-6557, vol. 125, No. 21.
Zhou et al., "Dispersion behavior of zirconia nancrystals and their surface functionalization with vinyl group-containing ligands," *Langmuir*, 2007, pp. 9178-9187, vol. 23.
English Translation of Apr. 23, 2014 Office Action issued in Japanese Patent Application No. JP 2009-224342.

*Primary Examiner* — Porfirio Nazario Gonzalez
(74) *Attorney, Agent, or Firm* — Oliff PLC

(57) ABSTRACT

The invention provides a surface-modified zirconia nanocrystal particle, wherein the surface of the zirconia nanoparticle is modified by organic sulfonyloxy groups, and a method of producing a zirconia nanocrystal particle whose surface is modified by carbonyloxy groups, organic phosphoryloxy groups or aryloxy groups. This makes it possible a highly stable surface-modified zirconia nanocrystal particle having a solvent dispersibility by a simple method. Further, it is possible to the surface-modified zirconia nanocrystal particle of the invention is equipped with a surface modifier having a structure that can be easily substituted with a desired functional group according to use. Furthermore, it is possible to the method of producing the surface-modified zirconia nanocrystal particle which is capable of easily producing that.

14 Claims, No Drawings

SURFACE-MODIFIED ZIRCONIA NANOCRYSTAL PARTICLE AND METHOD FOR PRODUCING SAME

TECHNICAL FIELD

The present invention relates to a surface-modified zirconia nanocrystal particle and a method of producing the same. In more detail, the invention relates to a solvent-dispersible surface-modified zirconia nanocrystal particle which is a high-refractive index and high-strength zirconia nanoparticle equipped with surface modifiers that play a role of making the zirconia nanoparticle stably dispersible in a desired solvent on the surface of the zirconia nanoparticle having an average particle diameter of about 1 nm to 20 nm, and have a structure that can be substituted with desired surface modifiers by a simple method.

BACKGROUND ART

In the past, a titania nanocrystal has been developed and used in a variety of fields due to its characteristic of a high refractive index.

For example, a silicone resin used as an LED sealing material is excellent in terms of heat resistance and light-fastness, but has a low refractive index, and therefore there is a problem of low efficiency of extracting light from an LED. In order to solve this problem, it has been attempted to improve the refractive index by synthesizing a titania nanocrystal which has been made oleophilic by surface modification and producing a composite with a silicone resin (Patent Document 1).

In addition, a zirconia nanocrystal has been developed and used for a variety of uses, such as a hard coating agent of glass lenses and a polishing agent, due to its characteristics of high refractive index and high strength.

For example, a method of synthesizing a zirconia nanocrystal having high dispersibility in an organic solvent is known (Non-Patent Document 1 and Non-Patent Document 2).

PATENT DOCUMENTS

[Patent Document 1] The pamphlet of WO2008/075784
[Non-Patent Document 1] Mizuno, M. et al., Langmuir 2006, 22, 7137-7140
[Non-Patent Document 2] Joo, J. et al., J. Am. Chem. Soc. 2003, 125, 6553-6557
[Non-Patent Document 3] Shuxue Zhou et al., Langmuir 2007, 23, 9178-9187

SUMMARY OF INVENTION

Technical Problem

The nanoparticle described in Patent Document 1 is integrally structured since the coating portion that coats the surface of the nanoparticle and the surface modifiers for solvent dispersibility originate from the same raw material. Therefore, there is a problem in that a selection scope of surface modifiers for the surface of a titania nanocrystal is narrow when the nanoparticle is applied to a variety of uses.

In addition, since a titania nanocrystal exhibits photochromism in which the titania nanocrystal is colored blue by irradiation of ultraviolet light of blue, the visible light transmissivity varies significantly. Therefore, it was found that a composite including the titania nanocrystal is not appropriate as an LED sealing material. Due to this problem, a zirconia nanocrystal can be an alternative to the titania nanocrystal as a high-refractive index and high-strength material.

When zirconia nanoparticles dispersed in a binder are used as an optical material, transparency in a dispersion state (composite) is required. The "transparency" means that light is seldom scattered. The present inventor studied "scattering of light," and, consequently, considered that it is necessary to satisfy that "a primary particle of a zirconia nanoparticle in a composite is small" and "generation of a secondary particle in a composite is suppressed." The latter is satisfied by suppressing agglomeration of the primary particles (uniform dispersion), for which it is effective to coat the surfaces of the zirconia nanoparticles with surface modifiers having a strong affinity to a binder material. That is, it was inferred that a "highly transparent composite" can be realized by "modifying the surfaces of nanoparticles having a small size so as to prevent agglomeration." The kind of the surface modifier for the surfaces of the nanoparticles to realize the "highly transparent composite" is determined by the relationship with the binder material.

In addition, when zirconia nanoparticles are accumulated, fixed, and the like on the surface of a substrate and the like, the zirconia nanoparticles can be fixed by chemical bonds between the substrate and nanoparticles by selecting a surface modifier that has a bonding functional groups at the end thereof as the surface modifier for the surfaces of the nanoparticles, and modifying the surface of the substrate in advance with a surface modifier having functional groups that bond with the above surface modifier. This method can accumulate nanoparticles on the surface of the substrate in only one layer, and is drawing attention in many fields.

In any case, in the past, since a zirconia nanoparticle having specific surface modifiers was synthesized individually, it was necessary to review the synthesis method (selection of raw materials, selection of conditions, and the like) every time the kind of the necessary surface modifier was altered. There were cases in which the kinds of the surface modifier were limited when raw materials were selected. In addition, there were frequent cases in which, even when a zirconia nanoparticle having targeted surface modifiers could be synthesized, the obtained zirconia nanoparticle had low stability and was not practical.

Non-Patent Document 1 describes a method of producing a zirconia nanocrystal having a particle diameter of about 2 nm by hydrolyzing zirconium alkoxide in a basic aqueous solution in the presence of an oleic acid, producing a precursor having a Zr—O—Zr bond, and then heating the precursor at 280° C.

Since the heating is carried out at 100° C. for the production of the precursor and the high temperature such as 280° C. for the subsequent production of the nanocrystals, in the method of Non-Patent Document 1, the method can be applied only to carboxylic acids which do not react and decompose under the above conditions, such as oleic acid, and selection limitation is large. Particularly, this method is not appropriate when introduction of a specific surface modifier, for example, a molecule having reactive functional groups, to the surface of a nanocrystal is desired. In addition, Non-Patent Document 1 describes that the obtained nanocrystal has the cubic structure, but the crystallinity of the nanocrystal is considered to be low according to the described XRD pattern, and material characteristics (high refractive index, high strength, and the like) cannot be expected.

Non-Patent Document 2 describes a method of producing a zirconia nanocrystal by an anhydrous sol-gel reaction using zirconium tetraisopropoxide and zirconium tetrachloride as raw materials. Non-Patent Document 2 describes trioctylphosphine oxide (TOPO), which is used as a solvent, acting as a surface modifier for the zirconia nanocrystal, and the zirconia nanocrystal can be dispersed in a nonpolar solvent, such as toluene.

The zirconia nanocrystal obtained by the method of Non-Patent Document 2 exhibits a dark green color due to the electron-donating of the surface modifier TOPO to zirconia, and is not eligible for optical uses. In addition, the reaction conditions of 340° C. and 2 hours are required, and it is hard to say that this method is a preferred method from the standpoint of safety or production costs. Furthermore, the anhydrous sol-gel reaction in Non-Patent Document 2 accompanies generation of 2-chloropropane, which is identified as an ozone layer destroying substance, and it is difficult to employ this method as a production method.

Non-Patent Document 3 describes a method, in which a solvent-non-dispersible zirconia nanocrystal is synthesized, and then surface modification is carried out on the surface of the nanocrystal, thereby producing a solvent-dispersible zirconia nanocrystal. Non-Patent Document 3 describes that the solvent-dispersible zirconia nanocrystal is obtained by using tetrahydrofuran (THF) as a solvent and 4 kinds of surface modifiers having a vinyl group, such as 3-(trimethoxysilyl)-propyl methacrylate (MPS), ethyl 3,4-dihydroxycinnamate (EDHC), allylmalonic acid (AMA), and trimethylol-propane mono aryl ether (TMPMA), respectively with respect to an non-dispersible zirconia nanocrystal obtained by the benzyl alcohol decomposition method, which has been developed by the authors, and optimizing the concentration of the surface modifier. Non-Patent Document 3 describes the anhydrous benzyl alcohol decomposition method as a feature, and is characterized in that the surface of the generated zirconia nanocrystal is coated with benzyl alcohol-derived molecules (the surface is coated with hydroxyl groups in an ordinary sol-gel method), which makes modification by the surface modifier possible.

However, the benzyl alcohol decomposition method of Non-Patent Document 3 has problems in that a large amount of benzyl alcohol having a boiling point of close to 200° C. is used, and the raw material of zirconium alkoxide is expensive, which makes the method inappropriate for mass production.

Furthermore, Non-Patent Document 3 reports that the concentration of the zirconia nanocrystal in the THF solvent is extremely low, about 1% by mass, and the solvent dispersiblity is obtained, but it is hard to say that the nanocrystal has sufficient functions as a nanocrystal for being mixed into a polymer or the like. In addition, Non-Patent Document 3 reports that a nanocrystal dispersion fluid is obtained, but it is considered that the dispersion fluid includes dissociated modifying molecules that are not bonded with the surfaces of the nanocrystals since the surface modifier is simply added. It is necessary to isolate the nanocrystal from the dispersion fluid in order to use the nanocrystal for a variety of uses (for example, production of a composite), but the surface modifiers are detached from the surface of the nanocrystal during the isolation operation, and there is a high possibility of losing the dispersiblity. Actually, the nanocrystals failed to be evenly dispersed even when it was attempted to disperse the isolated nanocrystals again in a solvent in experiments of the inventor. That is, the zirconia nanocrystal of Non-Patent Document 3 does not keep dispersing stably in a solvent.

The invention has been made to solve the above problems, and an object of the invention is to provide a highly stable surface-modified zirconia nanocrystal particle that can be produced by a simple method and has dispersbility in a solvent, and a method of producing the surface-modified zirconia nanocrystal particle in a simple manner. In addition, another object of the invention is to provide a surface-modified zirconia nanocrystal particle having a structure in which surface modifiers on the surface of the zirconia nanoparticle can be easily substituted with functional groups suitable for use, and a method of producing the surface-modified zirconia nanocrystal particle in a simple manner.

Solution to Problem

The inventor repeatedly carried out thorough studies in order to achieve the above objects, and found the following.

In the past, metallic oxide nanocrystals have been liable to be agglomerated. In addition, the "—OH groups" are bonded with each other in an agglomeration state, and it is impossible to inject a substituting modifier sterically in the above state such that it is difficult to substitute a modifier on the surface of a zirconia nanocrystal with another modifier. That is, the zirconia nanocrystal needs to be excellent in terms of solvent dispersibility for substituting the modifier.

In addition, substitution with another modifier is difficult even when the modifier on the surface of the zirconia nanocrystal is strongly bonded on the surface of the crystal. The surface of zirconia can be both acidic and basic; however, in the invention, attention is paid to the fact that the surface of zirconia can be weakly basic. Since the surface of a zirconia nanocrystal is "weakly basic," the inventor repeatedly carried out a variety of studies with a thought that selection of a modifier that can form ionic bonds with the surfaces of zirconia nanocrystals can facilitate substitution with another modifier, and found that an organic sulfonyloxy group, particularly, an arylsulfonyloxy group (a substituent may be included on the aromatic ring) is effective as a modifier.

In addition, the zirconia nanocrystal and the surface modifier can be interpreted as a "strong acid-weak base" ionic bond as described above. Therefore, additional studies were repeatedly carried out with attention to the fact that use of a salt of "an acid weaker than sulfonic acids" and a strong base can easily achieve substitution by a base-exchange reaction, and found that an organic sulfonyloxy group modifier can be easily substituted with a carbonyloxy group. The surface modifier can be easily substituted from "an organic sulfonyoxy group" with a weak acid residue (which is a group derived from a weak acid portion in a "salt of a weak acid and a strong base," which forms an ionic bond with the surface of the zirconia nanocrystal) by using an salt of "an acid weaker than sulfonic acids" and a strong base. Examples of the "acid weaker than sulfonic acids" include carboxylic acids, phosphate esters (monoesters and diesters), organic phosphonic acids and phosphinic acids, and phenols. With regard to the features of these weak acids, the carboxylic acids are easy to handle and can be obtained easily, which allows a wide scope of selection for modifiers; phosphonic acids and the phosphinic acids, and the phosphate esters are thermally stable; and the phenols are easy to handle.

The invention has been completed based on the above findings.

That is, in order to achieve the above objects, the invention is a surface-modified zirconia nanocrystal particle, in which the surface of the zirconia nanoparticle is modified by organic sulfonyloxy groups.

In addition, in the surface-modified zirconia nanocrystal particle of the invention, the organic sulfonyloxy group is preferably an alkylsulfonyloxy group that may have substituents.

In addition, in the surface-modified zirconia nanocrystal particle of the invention, the organic sulfonyloxy group is preferably an arylsulfonyloxy group that may have substituents on the aromatic ring.

In addition, in the surface-modified zirconia nanocrystal particle of the invention, the arylsulfonyloxy group is preferably a p-toluene sulfonyloxy group.

In order to achieve the above objects, the invention is a method of producing a zirconia nanocrystal particle whose surface is modified by weak acid residues, in which the surface modifier in the surface-modified zirconia nanocrystal particle is substituted from an organic sulfonyloxy group to the weak acid residue by using a salt composed of an acid weaker than sulfonic acids and a strong base.

In order to achieve the above objects, the invention is a method of producing a zirconia nanocrystal particle whose surface is modified by carbonyloxy groups, in which the surface modifier in the surface-modified zirconia nanocrystal particle is substituted with the carbonyloxy group.

In order to achieve the above objects, the invention is a method of producing a zirconia nanocrystal particle whose surface is modified by organic phosphoryl groups, in which the surface modifier in the surface-modified zirconia nanocrystal particle is substituted with the organic phosphoryloxy group.

In addition, in the method of producing the surface-modified zirconia nanocrystal particle of the invention, the surface modifier in the surface-modified zirconia nanocrystal particle is preferably substituted with the organic phosphoryloxy group by using organic phosphonic acids or organic phosphinic acids.

In addition, in the method of producing the surface-modified zirconia nanocrystal particle of the invention, the surface modifier in the surface-modified zirconia nanocrystal particle is preferably substituted with the organic phosphoryloxy group by using phosphate esters.

In order to achieve the above objects, the invention is a method of producing a zirconia nanocrystal particle whose surface is modified by aryloxy groups, in which the surface modifier in the surface-modified zirconia nanocrystal particle is substituted with the aryloxy group.

Advantageous Effects of Invention

According to the invention, it is possible to produce a highly stable surface-modified zirconia nanocrystal particle by a simple method. In addition, since the surface-modified zirconia nanocrystal particle of the invention is equipped with surface modifiers having a structure that can be easily substituted with a desired functional group on the surface, it is possible to obtain the surface-modified zirconia nanocrystal particle by a simple method of substitution of the functional group with no need to produce a surface-modified zirconia nanocrystal particle separately for each surface modifier when the necessary surface modifier is varied by use.

DESCRIPTION OF EMBODIMENTS

Firstly, the surface-modified zirconia nanocrystal particle of the invention will be described.

[Surface-Modified Zirconia Nanocrystal Particle]

In the surface-modified zirconia nanocrystal particle of the invention, the surface of the zirconia nanoparticle is modified by organic sulfonyloxy groups.

The organic sulfonyloxy group is preferably an arylsulfonyloxy group that may have substituents on an aromatic ring, and examples thereof can include a benzene-sulfonyloxy group, a p-toluene sulfonyloxy group, and the like. However, the p-toluene sulfonyloxy group (sometimes abbreviated as "PTSH"), which is the residue of p-toluenesulfonic acid, is particularly preferred since the p-toluene sulfonyloxy group is chemically stable and is a solid-state powder, which allows easy handling.

A PTSH modified zirconia nanocrystal particle has a structure represented by the following formula (1).

[Chemical 1]

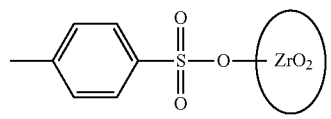

(1)

(Producing Method)

According to the method of the invention, the above surface-modified zirconia nanocrystal particle of the invention can be produced by reacting zirconia precursors and organic sulfonic acids in an organic solvent at a low temperature of 100° C. to 240° C.

Specifically, the zirconia precursor and the organic sulfonic acid, preferably an arylsulfonic acid, such as benzenesulfonic acid or p-toluenesulfonic acid, and particularly preferably p-toluenesulfonic acid, are reacted in an appropriate organic solvent, thereby forming an organic sulfonyloxy modified zirconia nanocrystal particle, particularly preferably a PTSH modified zirconia nanocrystal particle.

The zirconia precursor that is used at this time can include zirconyl chloride, tetraalkoxy zirconium, and the like, but zirconyl chloride is preferred from the viewpoint of chemical stability, easy handling, a low price, and reactivity, and zirconyl chloride octahydrate ($ZrOCl_2 \cdot 8H_2O$) is particularly preferred.

When p-toluenesulfonic acid is used as the raw material of the organic sulfonyloxy group, a molar ratio between Zr and p-toluenesulfonic acid in the zirconia precursor is preferably 8:1 to 1:2. When a fraction of p-toluenesulfonic acid is smaller than the above range, there is a concern in that the dispersibility of the PTSH modified zirconia nanocrystal particle may be degraded. A more preferred molar ratio between Zr and p-toluenesulfonic acid is in a range of 4:1 to 1:1.

The organic solvent is not particularly limited as long as the PTSH modified zirconia nanocrystal particle is effectively formed in the solvent, and, for example, a mixed solvent of ethanol and triethyl orthoformate, and the like can be preferably used.

When the mixed solvent of ethanol and triethyl orthoformate, the zirconyl chloride octahydrate, and the p-toluenesulfonic acid are used as the organic solvent, the zirconia precursor, and the raw material of the organic sulfonyloxy group (the organic sulfonic acid), respectively, the reaction is carried out in a pressurized vessel at a temperature of preferably 100° C. to 240° C., and more preferably 120° C. to 200° C. The reaction time depends on the reaction temperature, the amount of the organic sulfonic acid, and the like, and cannot be determined generally, but is ordinarily about 8 hours to 120 hours, and preferably 12 hours to 60 hours. A crystal structure of a generated zirconia nanocrystal can be selected by the reaction time. The optimal reaction time varies with the concentration of the raw material, the molar ratio between the zirconia precursor and the organic sulfonic acid, and the reaction temperature, but there is a tendency that a tetragonal zirconia nanocrystal is generated when the reaction time is shortened, and a monoclinic zirconia nanocrystal is generated when the reaction temperature is extended. The tetragonal zirconia nanocrystal has a higher refractive index than the monoclinic zirconia nanocrystal, and the monoclinic zirconia nanocrystal is considered to be more stable chemically than the tetragonal zirconia nanocrystal. It is possible to produce either of them depending on the use.

A PTSH modified zirconia nanocrystal particle having the structure represented by the above formula (1) is obtained by distilling away the solvent in the reaction solution preferably under a reduced pressure after the completion of the reaction.

The PTSH modified zirconia nanocrystal particle is obtained as a white powder and can be dispersed again in an organic solvent, such as methanol or methylene chloride so that a transparent colorless dispersion fluid of the zirconia nanocrystal particle can be obtained.

In the organic sulfonyloxy modified zirconia nanocrystal particle obtained in this manner, the zirconia nanocrystal and the surface modifier can be interpreted as an ionic bond of "a strong acid-a weak base." Therefore, use of a salt between "an acid weaker than sulfonic acids" and a strongly base can easily achieve substitution by a base-exchange reaction. The "acid weaker than sulfonic acids" is preferably a weak acid, such as a carboxylic acid, a phosphonic acid, a phosphinic acid, a phosphate ester, and phenols. When the modifier is substituted, the modifier can be substituted by using a sodium salt, a potassium salt, and the like of the above weak acids. In addition, when the acid is used as it is, the same reaction as when a weak acid salt is used is carried out by adding an alkali, such as sodium carbonate or sodium hydroxide (a salt is generated in a modifier substitution reaction system).

[Production of a Carbonyloxy Surface-Modified Zirconia Nanocrystal Particle]

A carbonyloxy surface-modified zirconia nanocrystal particle can be produced by substituting the surface modifier in the above organic sulfonyloxy surface-modified zirconia nanocrystal particle (the organic sulfonyloxy group) with a carbonyloxy group.

Specifically, a dispersion fluid is prepared by dispersing the organic sulfonyloxy surface-modified zirconia nanocrystal particle in an appropriate organic solvent, for example, a mixed solvent of, methanol and methylene chloride in a capacity ratio of about 9:1 to 1:9, preferably 7:3 to 5:5 (this is because the ordinary alkali salts of carboxylic acids are not soluble in a slightly polar solvent although the capacity ratio significantly depends on the kind of the carboxylic acids). At this time, the concentration of the crystal particles by Zr is about 0.5 mmol/10 ml to 15 mmol/10 ml, and preferably 2 mmol/10 ml to 8 mmol/10 ml.

Next, a carboxylic acid is dissolved in the dispersion fluid in a ratio of about 0.5 mol to 4 mol, and preferably 1 mol to 2 mol of the carboxylic acid to 1 mol of the organic sulfonic acid (for example, p-toluenesulfonic acid) that is used for the synthesis of the zirconia nanocrystal; furthermore, sodium carbonate is added in a ratio of about 0.25 mol to 2 mol, and preferably 0.5 mol to 1 mol, and the reaction solution is stirred at ordinary room temperature for about 8 hours to hours, and preferably 12 hours to 48 hours. After that, the solvent in the reaction solution is distilled away, a poor solvent of the modifier-substituted nanocrystal (methanol or the like) is added, a solid-liquid separation means, such as centrifugal separation, is carried out, the obtained precipitate is dispersed again in a good solvent, such as toluene, and, furthermore, the same methanol cleaning as the above is repeated several times.

Next, the sodium carbonate is removed by filtering the toluene dispersion fluid, thereby obtaining a carbonyloxy surface-modified zirconia nanocrystal particle.

It is possible to use carboxylic acids having a variety of functional groups as well as capric acid, lauric acid, myristic acid, palmitic acid, stearic acid, and the like as the carboxylic acid. The above carboxylic acids are particularly effective for introducing highly reactive carbonyloxy groups to the surface of the zirconia nanocrystal particle since the substitution reaction of the surface modifier of the invention proceeds even at room temperature. That is, the invention is particularly effective when the surface modifier on the surface of the nanoparticle is substituted with a carbonyloxy group having functional groups that are able to react. For example, it is also possible to use carboxylic acids having polymeric alkenyl groups or alkynyl groups as well as thermally stable aliphatic carboxylic acids. In addition, it is also possible to use carboxylic acids having reactive functional groups, such as hydroxyl groups, amino groups, thiol groups, carbonyl groups, nitrile groups, ester groups, and amide groups. Particularly, when a carboxylic acid having only slightly polar functional groups is used among the above, the zirconia nanocrystal in which the surface modifier has been substituted with the carboxylic acid is not evenly dispersed in a highly polar solvent, such as methanol, and therefore the purification step becomes simple, which is preferable.

On the other hand, when a carboxylic acid having a highly polar functional group, such as a hydroxyl group, is used, there are cases in which a zirconia nanoparticle having the surface modifier that has been substituted and the organic sulfonate generated due to a base-exchange reaction have the same dispersibility in a solvent, which makes purification difficult. In this case, the problem can be avoided by using a multi-step means, such as substituting with a carbonyloxy group having only slightly polar functional groups, removing sulfonate by purification, and substituting with a carbonyloxy group having highly polar functional groups.

Specifically, the modifier substitution is carried out by the above method using a carboxylic acid having only slightly polar functional groups. In this case, a carboxylic acid having a small number of bonds with the surface of the particle and high dispersion stability is preferred, and a carboxylic acid having a branched structure, particularly 2-ethylhexanoic acid, is preferred. The same methanol cleaning is repeated several times on the obtained surface-modified nanocrystal, thereby removing the organic sulfonate, which is a byproduct, and dispersing in toluene. Next, when the modifier is substituted with a carbonyloxy group having highly polar functional groups, a very large excess amount (about five times equivalent amount of 2-ethylhexanoic acid) of a carboxylic acid having highly polar functional groups is added to a mixed solvent of a nonpolar solution and a polar solution, for example, a solvent in which toluene and butanol are mixed in a capacity ratio of 1:1, and heating with reflux is carried out for about one hour. A zirconia nanocrystal particle in which the surface modifier is substituted with a carbonyloxy group having highly polar functional groups can be dispersed in a highly polar solvent, but is not easily dispersed in a nonpolar solvent. On the other hand, 2-ethylhexanoic acid, which is a byproduct, and the excess carboxylic acid can be dissolved in a nonpolar solvent. Here, since the organic sulfonate is removed by purification in the first substitution reaction, there is no problem. The purification step in which hexane is added, centrifugally separated, and dispersed again in ethanol is repeated several times, and, finally, a zirconia nanocrystal particle is dispersed in a highly polar solvent, such as ethanol, thereby obtaining a carbonyloxy modified zirconia nanocrystal particle having highly polar functional groups.

In addition, examples of the reactive substituent include substituents having a polyorganosiloxane (hereinafter sometimes referred to simply as "POS") chain.

The modifier substitution reaction can be represented by the following reaction formula (a) when the organic sulfonyloxy surface-modified zirconia nanocrystal particle is a PTSH surface-modified zirconia nanocrystal particle.

[Chemical 2]

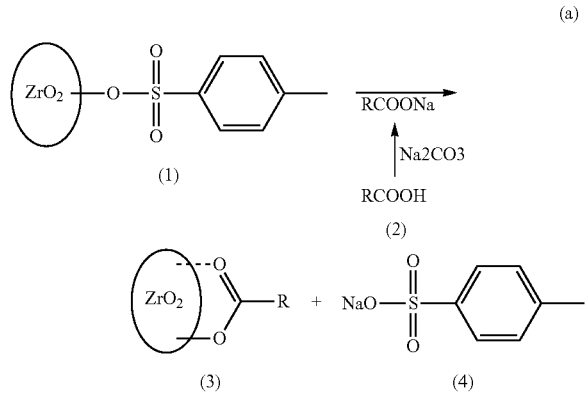

(In the formula, the "R" is a hydrocarbon group that may have substituents. Meanwhile, the line types (broken line, double line, and the like) shown in the chemical formula do not strictly express the bond types, and, for example, the bonds between the particle surface and the two oxygen atoms that bond with the particle surface may be mutually equivalent in the formula (3). The same thing applies in the following chemical formulas.)

That is, the carboxylic acid and sodium carbonate represented by the formula (2) are made to react with the PTSH surface-modified zirconia nanocrystal particle represented by the formula (1) so that the carbonyloxy surface-modified zirconia nanocrystal particle represented by the formula (3) is generated, and the sodium p-toluene-sulfonate represented by the formula (4) is generated as a byproduct.

When the "R" in the carboxylic acid represented by the formula (2) has a polyorganosiloxane chain, examples of the carbonyloxy surface-modified zirconia nanocrystal particle represented by the formula (3) include zirconia nanocrystal particles whose surface is modified by an aliphatic monocarbonyloxy group having a polydimethylsiloxane chain represented by the following formula (3-a) (hereinafter sometimes referred to simply as the "PDMS-carbonyloxy group").

[Chemical 3]

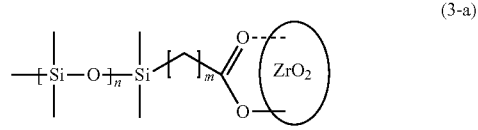

(In the formula, the "n" represents the number of a dimethylsiloxane unit, and the "m" represents the carbon number of an aliphatic group in an aliphatic monocarbonyloxy group.)

The "n" in the formula (3-a) is generally about 4 to 100, and the "m" is generally about 2 to 18.

A zirconia nanocrystal particle whose surface is modified by the PDMS-carbonyloxy group represented by the formula (3-a) can be preferably used as a component of a silicone-based complex material that is useful as a sealing material of light-emitting diodes (LEDs) and the like.

[Production of an Organic Phosphoryloxy Surface-Modified Zirconia Nanocrystal Particle]

An organic phosphoryloxy surface-modified zirconia nanocrystal particle can be produced by substituting the surface modifiers (the organic sulfonyloxy group) in the organic sulfonyloxy surface-modified zirconia nanocrystal particle with organic phosphoryloxy groups.

When an organic phosphonic acid or a phosphinic acid is used, it is possible to use the same method as for the carboxylic acid; however, when an acid is used as it is, it is preferable to add sodium hydroxide which is more basic than sodium carbonate since sodium carbonate is not sufficiently basic.

Examples of the organic phosphonic acid that can be used include organic phosphonic acids having a variety of functional groups, such as hydroxide groups, amino groups, thiol groups, and nitrile groups, as well as acids having an alkyl group or a phenyl group, such as phenylphosphonic acid.

As such, when the organic phosphonic acid or the phosphinic acid is used, an organic phosphoryloxy surface-modified zirconia nanocrystal particle represented by the following formula (5) or (6) can be obtained.

[Chemical 4]

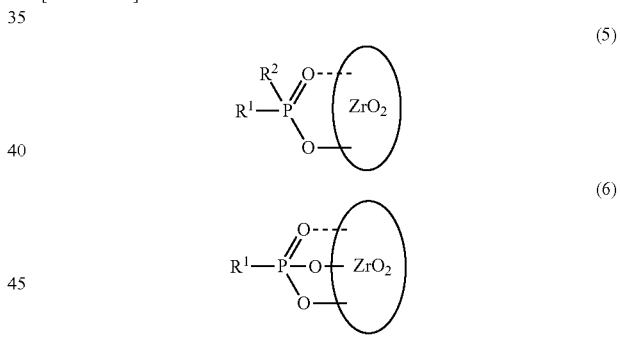

(In the formulas, the "$R^1$" represents a hydrocarbon group that may have substituents, and the "$R^2$" represents a hydrocarbon group that may have substituents, or a hydroxyl group.)

In addition, when a phosphate ester is used, it is possible to employ the same method as when the carboxylic acid is used as described above. Phosphate monoesters and phosphate diesters are preferred as the phosphate ester, and examples of the phosphate esters that can be used include phosphate esters having a variety of functional groups, such as hydroxyl groups, amino groups, thiol groups, and nitrile groups, as well as phosphate esters having an alkyl group or a phenyl group, such as phosphate monododecyl, phenyl phosphate, and phosphate diphenyl.

As such, when the phosphate ester is used, an organic phosphoryloxy surface-modified zirconia nanocrystal particle represented by the following formula (7) or (8) can be obtained.

[Chemical 5]

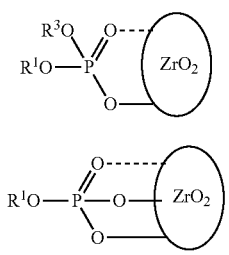

(7)

(8)

(In the formulas, the "$R^1$" represents a hydrocarbon group that may have substituents, and the "$R^3$" represents a hydrocarbon group that may have substituents, or a hydrogen atom.)

[Aryloxy Surface-Modified Zirconia Nanocrystal Particle]

An aryloxy surface-modified zirconia nanocrystal particle can be produced by substituting the surface modifiers (the organic sulfonyloxy group) in the organic sulfonyloxy surface-modified zirconia nanocrystal particle as described above into aryloxy groups.

Even when phenols are used, it is possible to employ the same method as when the carboxylic acid is used; however, when an acid is used as it is, it is preferable to add sodium hydroxide which is more basic than sodium carbonate since sodium carbonate is not sufficiently basic.

Multivalent phenols, such as a divalent phenol like catechol, resorcin, hydroquinone, orcin, urushiol, a trivalent phenol like pyrogallol, phloroglucine, and hydroxy-hydroquinon, as well as phenol can be used as the phenols, and it is also possible to use phenols having a variety of functional groups.

When the phenols are used in the above manner, an aryloxy surface-modified zirconia nanocrystal particle represented by the following formula (9) or (10) can be obtained.

[Chemical 6]

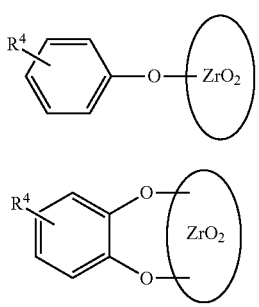

(9)

(10)

(In the formulas, the "$R^4$" represents a hydrocarbon group that may have substituents, a hydroxyl group, or a hydrogen atom.)

The surface-modified zirconia nanocrystal particle produced in the above manner is easily dispersed in a polymer, and, for example, when a zirconia nanocrystal particle is dispersed in a cyclo-olefin polymer, which is an optical resin, since the cyclo-olefin polymer and the zirconia nanocrystal particle exhibit an inverse behavior in the variation of the refractive index with temperature, an effect of offsetting the lowering of the refractive index of the cyclo-olefin polymer caused by a temperature increase by the improvement of the refractive index of the zirconia nanocrystal particle can be expected.

[Silicone-Based Composite Material]

As a silicone-based composite material used for a sealing material of LEDs and the like, a material including zirconia nanocrystal particles having a high refractive index in the matrix of a silicone resin which is hardened by crosslinking in a highly dispersed state is preferably used in order to secure the refractive index.

In order to highly disperse zirconia nanocrystal particles in the matrix of the silicone resin which is hardened by crosslinking, it is possible to use a zirconia nanocrystal particle whose surface is modified by aliphatic monocarbonyloxy groups having the polyorganosiloxane chain (hereinafter referred to simply as the "POS-carbonyloxy group").

Since the zirconia nanocrystal particle whose surface is modified by the POS-carbonyloxy groups, preferably PDMS-carbonyloxy groups, has a siloxane unit in the modifier, the zirconia nanocrystal particle is dispersed extremely favorably and stably in a thermosetting silicone resin which is hardened by crosslinking.

The content of the surface-modified zirconia nanocrystal particle in the silicone-based composite material is preferably 5% by mass to 80% by mass as $ZrO_2$, and more preferably 10% by mass to 50% by mass from the viewpoint of improvement in the refractive index and the dispersibility.

The silicone-based composite material can be produced efficiently by the method shown below.

The silicone-based composite material can be obtained efficiently by carrying out, for example, (a) a step in which a mixed solution including a thermosetting silicone resin, an organic solvent dispersion fluid of zirconia nanocrystal particles whose surface is modified by the POS-carbonyloxy groups, preferably the PDMS-carbonyloxy groups, and a hardening catalyst is prepared, (b) a step in which the solvent in the mixed solution is distilled away, and (c) a step in which the mixture is subjected to a heating treatment after the distillation of the solvent, thereby hardening the thermosetting silicone resin by crosslinking.

A mixture of an addition reaction-type silicone resin and a silicone-based crosslinking agent can be used as the thermosetting silicone resin that is used in the step (a). Examples of the addition reaction-type silicone resin include at least one selected from polyorganosiloxanes having an alkenyl group as the functional group in a molecule. Preferable examples of the polyorganosiloxanes having the alkenyl group as the functional group in the molecule include polydimethylsiloxanes having a vinyl group as the functional group, polydimethylsiloxanes having a hexenyl group as the functional group, and mixtures thereof.

Examples of the silicone-based crosslinking agent include polyorganosiloxanes having at least two silicon atom-bonded hydrogen atoms in a molecule, and specifically, dimethylhydrogen-siloxy group end-capped dimethyl-siloxane-methylhydrogensiloxane copolymers, trimethyl-siloxy group end-capped dimethyl siloxane-methylhydrogensiloxane copolymers, trimethyl-siloxane group end-capped poly(methyl-hydrogen-siloxane), poly(hydrogensilsesquioxane), and the like.

In addition, ordinary platinum-based compounds are used as the hardening catalyst. Examples of the platinum-based compounds include fine particle-shaped platinum, fine particle-shaped platinum absorbed on a carbon powder carrier, chloroplatinic acid, alcohol-modified chloroplatinic acid, olefin complexes of chloroplatinic acid, palladium, rhodium catalysts, and the like.

After the mixed solution including the thermosetting silicone resin, the organic solvent dispersion fluid of a zirconia nanocrystal particle whose surface is modified by the POS-carbonyloxy groups, preferably the PDMS-carbonyloxy group, and the hardening catalyst is prepared in the step (a), a highly viscous colorless transparent zirconia nanocrystal particle-containing silicone resin dispersion fluid is obtained by distilling away the solvent in the mixed solution in the step (b). Next, in the step (c), the silicone resin dispersion fluid is subjected to a heating treatment, for example, at a temperature of 100° C. to 200° C. for about 1 hour to 12 hours, thereby hardening the thermosetting silicone resin by crosslinking so as to obtain the silicone-based complex material.

The silicone-based complex material obtained in the above manner is transparent, and the refractive index is generally about 1.4 to 1.6 while the refractive index depends on the content of the zirconia nanocrystal particle.

EXAMPLES

Next, the invention will be described in more detail by examples, but the invention is not limited by the examples.

Example 1

Production of a PTSH Surface-Modified Zirconia Nanocrystal Particle 1.29 g (4 mmol) of zirconium oxychloride octahydrate ($ZrOCl_2 \cdot 8H_2O$, produced by Kanto Chemical Co., Inc.) and 190 mg (1 mmol) of p-toluene sulfonic acid monohydrate (produced by Kanto Chemical Co., Inc.) were dissolved in a mixed solvent of 20 ml of ethanol (produced by Wako Pure Chemical Industries, Ltd.) and 5 ml of triethyl orthoformate (produced by Kanto Chemical Co., Inc.).

This solution was packed in a pressurized vessel (a stainless steel pressurized vessel having an attached 50 ml TEFLON (registered trademark) cylinder), heated in an oven at 170° C. for 40 hours, cooled at room temperature, and removed from the pressurized vessel. At this time, the reaction solution was colorless and transparent, and had no observed precipitate.

After the solvent was removed by reducing the pressure of the reaction solution using an evaporator, 670 mg of zirconia nanocrystal white powder was obtained. 3 ml of methanol (produced by Kanto Chemical Co., Inc.) and 3 ml of methylene chloride (produced by Wako Pure Chemical Industries, Ltd.) were added to the zirconia nanocrystal white powder so that a colorless and transparent zirconia nanoparticle dispersion solution in which the zirconia nanocrystal white powder could be evenly dispersed again was obtained.

As a result of an analysis of the white powder by powder X-ray diffraction (XRD), it was confirmed that the crystal shape was a tetragonal zirconia crystal. In addition, as a result of an observation by infrared (IR) spectroscopy, it was confirmed that PTSH was chemically bonded with the surface of the zirconia nanoparticle in the PTSH surface-modified zirconia nanocrystal particle of the white powder. In addition, as a result of an observation using a transmission electron microscope (TEM), it was confirmed that the PTSH surface-modified zirconia nanocrystal particle was a fine crystal having a diameter of 2 nm to 3 nm. In addition, as a result of measuring the composition ratio of the product by elementary analysis using an inductively-coupled plasma atomic emission spectrometer (ICP-AES), Zr/S was 4.06 [mole ratio].

Example 2

Production of an Ethanesulfonyloxy Surface-Modified Zirconia Nanocrystal Particle 600 mg of the white to slightly yellow powder of a zirconia nanocrystal was obtained by carrying out the same operation as in that of Example 1 except that 82 µl (1 mmol) of ethanesulfonic acid (produced by Tokyo Chemical Industry Co., Ltd.) was used instead of p-toluene sulfonic acid monohydrate. When 5 ml of methanol was added to the obtained powder, the powder was uniformly dispersed again, thereby obtaining a uniform dispersion solution of the zirconia nanocrystal. By observations using IR spectroscopy, XRD, and a TEM, it was confirmed that the product was the same as that of Example 1 (the ethanesulfonyl group was chemically bonded with the surface of the nanocrystal, the crystal shape was a tetragonal zirconia crystal, and the particle was a fine crystal having a diameter of 2 nm to 3 nm). In addition, the composition ratio of the product by elementary analysis using an ICP-AES was Zr/S=4.02 [mole ratio].

Example 3

Production of a PTSH Surface-Modified Zirconia Nanocrystal Particle 669 mg of the white powder of a zirconia nanocrystal was obtained by carrying out the same operation as in Example 1 except that 1.31 g (4 mmol) of zirconium tetraisopropoxide (produced by Kanto Chemical Co. Inc.) was used instead of zirconium oxychloride octahydrate, and only 25 ml of ethanol (triethyl orthoformate was not used) was used as the solvent. The obtained powder was uniformly dispersed again in 6 ml of a mixed solvent of methanol and methylene chloride (in a volume ratio of 1:1), thereby obtaining a uniform dispersion solution of zirconia nanocrystals. By observations using IR spectroscopy, XRD, and a TEM, it was confirmed that the product was the same as that of Example 1 (the PTSH was chemically bonded with the surface of the nanocrystal, the crystal shape was a tetragonal zirconia crystal, and the particle was a fine crystal having a diameter of 2 nm to 3 nm). In addition, the composition ratio of the product by elementary analysis using the inductively-coupled plasma atomic emission spectrometer (ICP-AES) was Zr/S=4.04 [mole ratio].

Example 4

Production of a PTSH Surface-Modified Monoclinic Zirconia Nanocrystal Particle 670 mg of the slightly yellow powder that was uniformly dispersible in a mixed solvent of methylene chloride and methanol was obtained by carrying out the same operation as in Example 1 except that the number of heating hours was set to 120 hours. As a result of an observation using IR spectroscopy, it was confirmed that the PTSH was chemically bonded with the surface of the zirconia nanoparticle. By observations using XRD and a TEM, it was confirmed that the product was a monoclinic zirconia fine crystal having a particle size of 3 nm to 4 nm. In addition, as a result of measuring the composition ratio of the product by elementary analysis using an inductively-coupled plasma atomic emission spectrometer (ICP-AES), Zr/S was 4.00 [mole ratio]. The monoclinic zirconia nanocrystal is excellent in terms of chemical stability, but has inferior characteristics to the tetragonal crystal in terms of the refractive index.

Example 5

Substitution of the Modifier of a Surface-Modified Zirconia Nanocrystal Particle (an Example of PTSH→Lauric Acid Residue)

670 mg of the PTSH surface-modified zirconia nanocrystal particles obtained in Example 1 was dispersed again in 13 ml of a mixed solvent of methanol and methylene chloride in a capacity ratio of 10:3, thereby producing a uniform dispersion solution.

200 mg (1 mmol) of lauric acid ($C_{11}H_{23}COOH$, produced by Wako Pure Chemical Industries, Ltd.) was dissolved in this solution, and, furthermore, 58 mg (0.55 mmol) of sodium carbonate (produced by Kojundo Chemical Laboratory Co., Ltd.) was added and stirred at room temperature for one night, thereby obtaining a white turbid solution having a white precipitate. The solvent was removed from the solution using an evaporator, an excess amount (25 ml) of methanol was added, and centrifugal separation was carried out, thereby recovering the precipitate. When toluene (produced by Kanto Chemical Co., Inc.) was added to the precipitate, the resulting substance became a colorless transparent dispersion solution, which confirmed that the precipitate was favorably dispersed in toluene. Purification by the same methanol cleaning (fractionation of solid material by addition of methanol and centrifugal separation, and dispersion in toluene) was repeated three times.

When the solid material (sodium carbonate) was removed by filtering the obtained toluene dispersion fluid, a dispersion fluid of a zirconia nanocrystal particle whose surface was modified by lauric acid residues ($C_{11}H_{23}COO$-group: lauroyloxy group) was obtained.

As a result of measuring the composition ratio of Zr/S in the zirconia nanocrystal particle by elementary analysis using an ICP-AES, the raw material had a Zr/S of 4.06 [mole ratio], and the product had a Zr/S of 100 [mole ratio]. It was confirmed that the surface modifier on the surface of the zirconia nanocrystal particle was substituted from the PTSH to the lauric acid residue from the fact that most of the sulfur was lost. In addition, it was confirmed by an IR measurement that the $C_{11}H_{23}COO$-group modified the surface of the nanocrystal particle. Furthermore, it was confirmed by observations using XRD and a TEM that the portion of the zirconia nanocrystal did not alter from the nanocrystal obtained in Example 1 (the crystal shape was a tetragonal zirconia crystal, and the particle was a fine crystal having a diameter of 2 nm to 3 nm).

Meanwhile, according to the examples, it is possible to recover the excess lauric acid. When the supernatant solution during the centrifugal separation in the methanol cleaning was concentrated by an evaporator, a white paste-shaped solid material was obtained. Hydrochloric acid water was added so as to make the solid solution acidic (about pH 3), and, furthermore, ether was added and stirred until the solid solution was fully dissolved.

After the ester layer was separated from the obtained solution, furthermore, the water layer was extracted twice using ether. The entire ether-extracted layer was cleaned twice with pure water, dried using anhydrous sodium sulfate, and the ether was distilled away using an evaporator, whereby the lauric acid could be recovered.

Example 6

Substitution of the Modifier of a Surface-Modified Zirconia Nanocrystal Particle (an Example of PTSH→4-Vinylbenzoic Acid Residue)

A zirconia nanocrystal whose surface was modified by carbonyloxy groups having a vinylphenyl group introduced to the surface was produced by carrying out the same operation as in Example 5 except that 148 mg (1 mmol) of 4-vinylbenzoic acid was used instead of lauric acid. As a result of measuring the composition ratio of Zr/S by elementary analysis using an ICP-AES, the raw material had a Zr/S of 4.06 [mole ratio], and the product had a Zr/S=154 [mole ratio]. It was confirmed that the surface modifier on the surface of the zirconia nanocrystal particle was substituted from the PTSH to a 4-vinylbenzoic acid residue ($C_2H_3C_6H_5COO$-group: 4-vinyl-benzoyloxy group) from the fact that most of the sulfur was lost. It was confirmed by an IR measurement that the vinyl-phenyl group was introduced to the surface of the zirconia nanocrystal without being decomposed. Furthermore, it was confirmed by observations using XRD and a TEM that the portion of the zirconia nanocrystal did not alter from the nanocrystal obtained in Example 1 (the crystal shape was a tetragonal zirconia crystal, and the particle was a fine crystal having a diameter of 2 nm to 3 nm).

According to the invention, it is possible to easily introduce a carbonyloxy group to the surface of the nanoparticle even when a carboxylic acid having functional groups that are able to react is used as in the present example.

Example 7

Substitution of the Modifier of a Surface-Modified Zirconia Nanocrystal Particle (an Example of Ethansulfonyloxy Group→Lauric Acid Residue)

A zirconia nanocrystal particle whose surface was modified by lauric acid groups ($C_{11}H_{23}COO$-group) was obtained by carrying out the same operation as in Example 5 except that the zirconia nanocrystal obtained in Example 2 was used instead of the zirconia nanocrystal obtained in Example 1, and 10 ml of methanol was used as the reaction solvent. As a result of measuring the composition ratio of Zr/S by elementary analysis using an ICP-AES, the raw material had a Zr/S of 4.06 [mole ratio], and the product had a Zr/S=215 [mole ratio]. It was confirmed that the surface modifier on the surface of the zirconia nanocrystal particle was substituted from the PTSH to a lauric acid residue ($C_{11}H_{23}COO$-group: lauroyloxy group) from the fact that most of the sulfur was lost. In addition, it was confirmed by an IR measurement that the lauric acid residue ($C_{11}H_{23}COO$-group) modified the surface of the nanocrystal particle. Furthermore, it was confirmed by observations using XRD and a TEM that the portion of the zirconia nanocrystal did not alter from the nanocrystal obtained in Example 2 (the crystal shape was a tetragonal zirconia crystal, and the particle was a fine crystal having a diameter of 2 nm to 3 nm).

Example 8

Substitution of the Modifier of a Surface-Modified Zirconia Nanocrystal Particle (an Example of PTSH→Lauric Acid Residue)

A lauric acid residue modified zirconia nanocrystal was synthesized by carrying out the same operation as in Example 5 except that 222 mg (1 mmol) of sodium laurate (produced by Kanto Chemical Co., Inc.) was used instead of lauric acid and sodium carbonate. As a result of measuring the composition ratio of Zr/S by elementary analysis using an ICP-AES, the raw material had a Zr/S of 4.06 [mole ratio], and the product had a Zr/S=164 [mole ratio]. It was confirmed that the surface modifier on the surface of the zirconia nanocrystal particle was substituted from the PTSH to the lauric acid residue ($C_{11}H_{23}$COO-group: lauroyloxy group) from the fact that most of the sulfur was lost. In addition, it was confirmed by an IR measurement that the lauric acid residue ($C_{11}H_{23}$COO-group) modified the surface of the nanocrystal particle. Furthermore, it was confirmed by observations using XRD and a TEM that the portion of the zirconia nanocrystal did not alter from the nanocrystal obtained in Example 1 (the crystal shape was a tetragonal zirconia crystal, and the particle was a fine crystal having a diameter of 2 nm to 3 nm).

Example 9

Substitution of the Modifier of a Surface-Modified Monoclinic Zirconia Nanocrystal Particle (An Example of PTSH→Lauric Acid Residue)

A monoclinic zirconia nanocrystal whose surface was modified by a lauric acid residue ($C_{11}H_{23}$COO-group: lauroyloxy group) was synthesized by carrying out the same operation as in Example 5 except that the monoclinic zirconia nanocrystal obtained in Example 4 was used instead of the zirconia nanocrystal obtained in Example 1. The product was favorably and uniformly dispersed in toluene. As a result of measuring the composition ratio of Zr/S by elementary analysis using an ICP-AES, the raw material had a Zr/S of 4.00 [mole ratio], and the product had a Zr/S=133 [mole ratio]. It was confirmed that the surface modifier on the surface of the zirconia nanocrystal particle was substituted from the PTSH to the lauric acid residue ($C_{11}H_{23}$COO-group) from the fact that most of the sulfur was lost. In addition, it was confirmed by an IR measurement that the lauric acid residue ($C_{11}H_{23}$COO-group) modified the surface of the nanocrystal particle. Furthermore, it was confirmed by observations using XRD and a TEM that the portion of the zirconia nanocrystal did not alter from the nanocrystal obtained in Example 4 (the crystal shape was a monoclinic zirconia crystal, and the particle was a fine crystal having a diameter of 3 nm to 4 nm).

Example 10

Multi-Step Substitution of the Modifier of a Surface-Modified Zirconia Nanocrystal Particle (an Example of PTSH 2-ethylhexanoic acid residue→4-hydroxyphenylacetic acid residue)

A zirconia nanocrystal modified by a 2-ethylhexanoic acid residue was synthesized by carrying out the same operation as in Example 5 (the method of converting to lauric acid) except that 144 mg (1 mmol) of a 2-ethylhexanoic acid ($CH_3(CH_2)_3CH(C_2H_5)COOH$), produced by Kanto Chemical Co., Inc.) was used instead of lauric acid. It was confirmed by elementary analysis using an ICP-AES that the surface modifier on the surface of the zirconia nanocrystal particle was substituted from the PTSH to the 2-ethylhexanoic acid residue from the fact that most of the sulfur was lost. In addition, it was confirmed by an IR measurement that the 2-ethylhexanoic acid residue ($CH_3(CH_2)_3CH(C_2H_5)$COO-group) modified the surface of the nanocrystal particle. Furthermore, it was confirmed by observations using XRD and a TEM that the portion of the zirconia nanocrystal did not alter from the nanocrystal obtained in Example 1 (the crystal shape was a tetragonal zirconia crystal, and the particle was a fine crystal having a diameter of 2 nm to 3 nm).

The obtained product was fed in a 50 ml round-bottomed flask, and 5 ml of toluene and 5 ml of 1-butanol (produced by Kanto Chemical Co., Inc.) were added, thereby preparing a uniform dispersion solution. 761 mg (5 mmol) of 4-hydroxyphenylacetic acid ($HO(C_6H_4)CH_2COOH$, produced by Tokyo Chemical Industry Co., Ltd.) was added to the dispersion fluid, a Dimroth cooler tube was mounted, and then the resulting substance was heated and refluxed for one hour using an oil bath so that the white precipitate of a zirconia nanocrystal in which the surface modifier was substituted from a 2-ethylhexanoic acid residue ($CH_3(CH_2)_3CH(C_2H_5)$COO-group) to a 4-hydroxyphenylacetic acid residue ($HO(C_6H_4)CH_2COOH$-group) was generated. The solvent was dried using an evaporator, 25 ml of hexane was added, and a solid material was separated using centrifugal separation. When 2 ml of ethanol was added to the solid material, a colorless and transparent dispersion solution was obtained. Purification of a 4-hydroxyphenylacetic acid residue modified zirconia nanocrystal was carried out by repeating three times the fractionation of the solid material by the addition of hexane and the centrifugal separation and the dispersion of the ethanol. It was confirmed by an IR measurement that the 4-hydroxyphenylacetic acid modified the surface of the nanocrystal particle. Furthermore, it was confirmed by observations using XRD and a TEM that the portion of the zirconia nanocrystal did not alter from the raw material of the 2-ethylhexanoic acid residue modified zirconia nanocrystal (the crystal shape was a tetragonal zirconia crystal, and the particle was a fine crystal having a diameter of 2 nm to 3 nm).

According to the invention, it is possible to introduce a residue to the surface of the nanoparticle even when a weak acid residue having a highly polar functional group is used as in the present example, and the purification step can be simplified by carrying out base-exchange reactions in multiple steps.

Example 11

Substitution of the Modifier of a Surface-Modified Zirconia Nanocrystal Particle (an Example of PTSH→2-Dodecyl Phosphonate Acid Residue)

A dodecyl phosphonate modified zirconia nanocrystal was synthesized by carrying out the same operation as in Example 5 (a method of converting to lauric acid) except that 266 mg (1 mmol) of dodecyl phosphonate ($C_{12}H_{25}PO(OH)_2$, produced by Wako Chemical, Ltd.) was used instead of lauric acid, and 2 ml of a 1 mol/L methanolic solution of sodium hydroxide (produced by Wako Pure Chemical Industries, Ltd.) was used instead of sodium carbonate. As a result of measuring the composition ratio of Zr/S by elementary analysis using an ICP-AES, the raw material had a Zr/S of 4.06 [mole ratio], and the product had a Zr/S=215 [mole ratio]. It was confirmed that the surface modifier on the surface of the zirconia nanocrystal particle was substituted from the PTSH to a dodecyl phosphonate residue ($C_{12}H_{25}PO(OH)O$-group) from the fact that most of the sulfur was lost. In addition, it was confirmed by an IR measurement that the dodecyl phosphonate modified the surface of the nanocrystal particle. Furthermore, it was confirmed by observations using XRD and a TEM that the portion of the zirconia nanocrystal did not alter from the nanocrystal obtained in Example 1 (the crystal shape was a tetragonal zirconia crystal, and the particle was a fine crystal having a diameter of 2 nm to 3 nm).

Example 12

Substitution of the Modifier of a Surface-Modified Zirconia Nanocrystal Particle (an Example of PTSH→Monododecyl Phosphonate Residue)

A monododecyl phosphonate modified zirconia nanocrystal was synthesized by carrying out the same operation as in Example 5 except that 288 mg (about 1 mmol) of sodium monododecyl phosphonate $(CH_3(CH_2)_{11}OPO(OH)ONa$, produced by Tokyo Chemical Industry Co., Ltd.) was used instead of lauric acid and sodium carbonate. It was confirmed by elementary analysis using ICP-AES that the surface modifier on the surface of the zirconia nanocrystal particle was substituted from the PTSH to a monododecyl phosphonate residue from the fact that most of the sulfur was lost. In addition, it was confirmed by an IR measurement that the monododecyl phosphonate residue $(CH_3(CH_2)_{11}OPO(OH)O$-group) modified the surface of the nanocrystal particle. Furthermore, it was confirmed by observations using XRD and a TEM that the portion of the zirconia nanocrystal did not alter from the nanocrystal obtained in Example 1 (the crystal shape was a tetragonal zirconia crystal, and the particle was a fine crystal having a diameter of 2 nm to 3 nm).

Example 13

Substitution of the Modifier of a Surface-Modified Zirconia Nanocrystal Particle (an Example of PTSH→bis(2-ethylhexyl) phosphinate residue)

A bis(2-ethylhexyl)phosphinate modified zirconia nanocrystal was synthesized by carrying out the same operation as in Example 5 except that 329 μl (1 mmol) of bis(2-ethylhexyl) hydrogen phosphate $((C_8H_{17}O)_2POOH$, produced by Tokyo Chemical Industry Co., Ltd.) was used instead of lauric acid. It was confirmed by elementary analysis using ICP-AES that the surface modifier on the surface of the zirconia nanocrystal particle was substituted from the PTSH to a bis(2-ethylhexyl) phosphinate residue from the fact that most of the sulfur was lost. In addition, it was confirmed by an IR measurement that the bis(2-ethylhexyl)phosphinate residue $((C_8H_{17}O)_2POO$-group) modified the surface of the nanocrystal particle. Furthermore, it was confirmed by observations using XRD and a TEM that the portion of the zirconia nanocrystal did not alter from the nanocrystal obtained in Example 1 (the crystal shape was a tetragonal zirconia crystal, and the particle was a fine crystal having a diameter of 2 nm to 3 nm).

Example 14

Substitution of the Modifier of a Surface-Modified Zirconia Nanocrystal Particle (an Example of PTSH→4-butylphenol residue)

A 4-butylphenol modified zirconia nanocrystal was synthesized by carrying out the same operation as in Example 11 (the example of dodecyl phosphonate) except that 150 mg (1 mmol) of 4-butylphenol $(C_{10}H_{13}OH$, produced by Tokyo Chemical Industry Co., Ltd.) was used instead of a dodecyl phosphonate. As a result of measuring the composition ratio of Zr/S by elementary analysis using an ICP-AES, the raw material had a Zr/S of 4.06 [mole ratio], and the product had a Zr/S=184 [mole ratio]. It was confirmed that the surface modifier on the surface of the zirconia nanocrystal particle was substituted from the PTSH to a 4-butylphenol residue from the fact that most of the sulfur was lost. In addition, it was confirmed by an IR measurement that the 4-butylphenol residue $(C_{10}H_{13}O$-group) modified the surface of the nanocrystal particle. Furthermore, it was confirmed by observations using XRD and a TEM that the portion of the zirconia nanocrystal did not alter from the nanocrystal obtained in Example 1 (the crystal shape was a tetragonal zirconia crystal, and the particle was a fine crystal having a diameter of 2 nm to 3 nm).

Example 15

Production of a Silicone-Based Complex Material (1) Substitution of the Surface Modifier of the PTSH Modified Zirconia Nanocrystal Particle The PTSH modified zirconia nanocrystal particle obtained in Example 1 was dispersed again in a mixed solvent of methanol and methylene chloride in a volume ratio of 10:3. At this time, the PTSH modified zirconia nanocrystal particle was dispersed again so that an amount of the solvent was 10 ml to 4 mmol of Zr.

1 mmol of a carboxylic acid having a polydimethylsiloxane chain for which the average number of the polydimethylsiloxane units was 12 (a molecule which is the surface-modified molecule of the [Chemical 3] formula and had an average of the n of 12 and the m of 10 was used, and this molecule will be referred to as the "PDMS-carboxylic acid.") and 0.55 mmol of sodium carbonate were added to 10 ml of the re-dispersed fluid, and the resulting substance was stirred at room temperature for one night, thereby obtaining a white turbid reaction fluid.

Next, the reaction fluid was concentrated by an evaporator, methanol was added in excess, and centrifugal separation was carried out, thereby recovering precipitates. It was confirmed that the precipitation was favorably dispersed in toluene. The same methanol cleaning was repeated several times.

When the obtained toluene dispersion fluid was filtered, and the sodium carbonate was removed, so that a dispersion fluid of the zirconia nanocrystal particle whose surface was modified by the PDMS-carbonyloxy group was obtained. As a result of measuring the composition ratio of Zr/S by elementary analysis using an ICP-AES, the raw material had a Zr/S of 4.06 [mole ratio], and the product had a Zr/S=431 [mole ratio]. It was confirmed that the surface modifier on the surface of the zirconia nanocrystal particle was substituted from the PTSH to the PDMS-carbonyloxy group from the fact that most of the sulfur was lost. In addition, it was confirmed by an IR measurement that the PDMS-carbonyloxy group modified the surface of the nanocrystal particle. Furthermore, it was confirmed by observations using XRD and a TEM that the portion of the zirconia nanocrystal did not alter from the nanocrystal obtained in Example 1 (the crystal shape was a tetragonal zirconia crystal, and the particle was a fine crystal having a diameter of 2 nm to 3 nm).

In addition, it was possible to recover the excess carboxylic acid having the polydimethylsiloxane chain by the method as described in Example 5.

(2) Production of a Silicone-Based Complex Material

A toluene dispersion fluid of a zirconia nanocrystal particle containing 1 g of $ZrO_2$ whose surface was modified by the PDMS-carbonyloxy group obtained in the above (1) was added to 2 g of a substance, in which both components of "IVS4312" (LED encap material) A and B, produced by Momentive Performance Materials Inc., were mixed at the same amount, and well mixed, thereby preparing a dispersion fluid.

Next, the solvent in the mixed solution was distilled away using an evaporator, thereby obtaining a viscous, colorless, and transparent $ZrO_2$ nanocrystal particle-containing silicone resin dispersion fluid. Next, the silicone resin dispersion fluid was hardened by carrying out a heating treatment at 160° C. for 12 hours in an oven, thereby obtaining a transparent $ZrO_2$.silicone-based complex material. The content of $ZrO_2$ in the complex material was 50% by mass, and the refractive index of the complex material was 1.51. The refractive index of the silicone resin produced without adding a zirconia nanocrystal was 1.41, which showed that mixing with a zirconia nanocrystal is effective for improvement of the refractive index of a resin.

INDUSTRIAL APPLICABILITY

Since the surface-modified zirconia nanocrystal particle of the invention is equipped with a surface modifier having a structure that can be easily substituted with a desired functional group on the surface, it is possible to obtain a surface-modified zirconia nanocrystal particle by a simple method of substitution of the functional group with no need to produce a surface-modified zirconia nanocrystal particle separately for each surface modifier when the necessary surface modifier is varied according to use. Therefore, the surface-modified zirconia nanocrystal particle and the method of producing the surface-modified zirconia nanocrystal particle according to the invention have industrial applicability.

The invention claimed is:

1. A method of producing a zirconia nanocrystal particle of which surface is modified with residues of weaker acids than sulfonic acids, the method comprising:
reacting a surface-modified zirconia nanocrystal particle of which surface is surface-modified with organic sulfonyloxy groups with a salt constituted of the weaker acids and strong bases to substitute the organic sulfonyloxy groups with the residues of the weaker acids to thereby obtain the zirconia nanocrystal particle.

2. The method as claimed in claim 1, wherein the residues of the weaker acids are carbonyloxy groups.

3. The method as claimed in claim 1, wherein the residues of the weaker acids are organic phosphoryloxy groups.

4. The method as claimed in claim 3, wherein the weaker acids include an organic phosphonic acid or an organic phosphinic acid.

5. The method as claimed in claim 3, wherein the weaker acids include a phosphate ester.

6. The method as claimed in claim 1, wherein the residues of the weaker acids are aryloxy groups.

7. The method as claimed in claim 1, wherein the strong bases include sodium carbonate or sodium hydroxide.

8. The method as claimed in claim 1 further comprising:
mixing the surface-modified zirconia nanocrystal particle, the weaker acids and the strong bases with each other before the reacting the surface-modified zirconia nanocrystal particle with the salt.

9. The method as claimed in claim 1, wherein the surface-modified zirconia nanocrystal particle is obtained by mixing a zirconia precursor with organic sulfonic acids and reacting the zirconia precursor with the organic sulfonic acids under a condition of heating and pressuring.

10. A surface-modified zirconia nanocrystal particle comprising:
a zirconia nanocrystal particle having a surface; and
organic sulfonyloxy groups modifying the surface of the zirconia nanocrystal particle.

11. The surface-modified zirconia nanocrystal particle as claimed in claim 10, wherein the organic sulfonyloxy groups are alkylsulfonyloxy groups which may have substituents.

12. The surface-modified zirconia nanocrystal particle as claimed in claim 11, wherein the alkylsulfonyloxy groups are ethanesulfonyloxy groups.

13. The surface-modified zirconia nanocrystal particle as claimed in claim 10, wherein the organic sulfonyloxy groups are arylsulfonyloxy groups which may have substituents to be bonded to an aromatic ring of each arylsulfonyloxy group.

14. The surface-modified zirconia nanocrystal particle as claimed in claim 13, wherein the arylsulfonyloxy groups are p-toluene sulfonyloxy groups.

* * * * *